March 15, 1927.
A. E. DENTLER
1,620,634
FRICTION SHOCK ABSORBING MECHANISM
Filed March 15, 1923
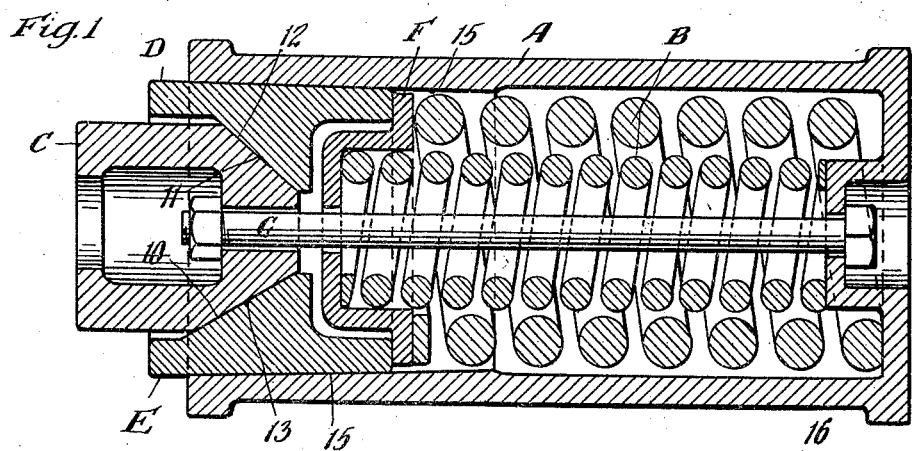
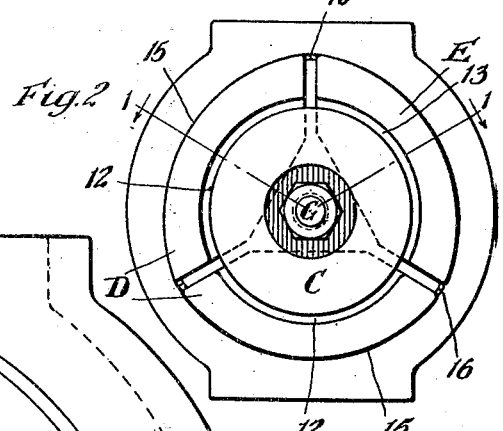
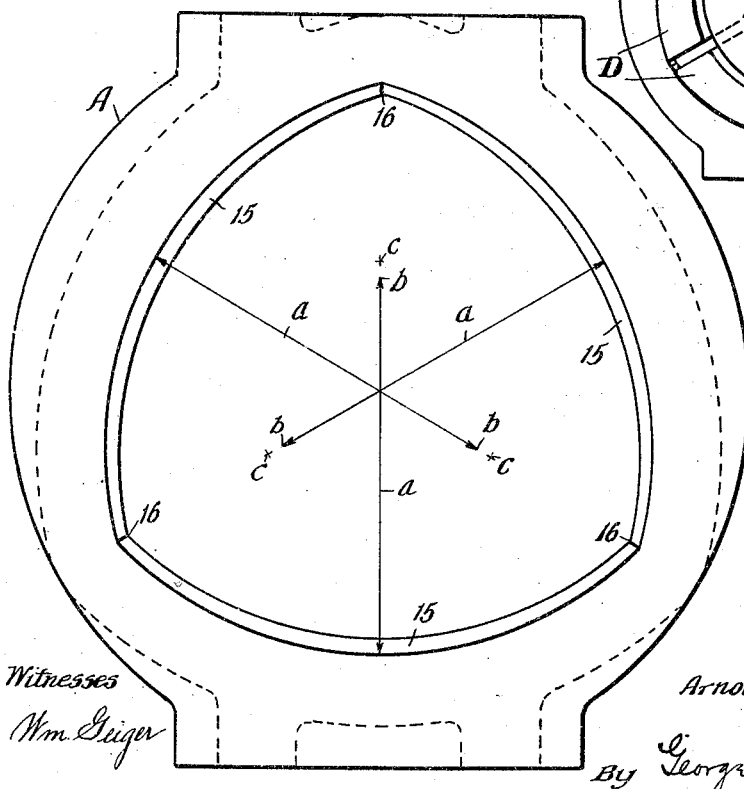
Witnesses
Wm. Geiger
Inventor
Arnold E. Dentler
By George I. Haight
His Atty.

Patented Mar. 15, 1927.

1,620,634

UNITED STATES PATENT OFFICE.

ARNOLD E. DENTLER, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed March 15, 1923. Serial No. 625,192.

This invention relates to improvements in friction shock absorbing mechanisms.

In the art of friction shock absorbing mechanisms, and more particularly those designed for railway draft riggings, it is a well known fact that a true cylindrical friction shell of given diameter and thickness of metal, provides the maximum amount of friction surface and greatest strength against bursting stresses. Furthermore, when such a cylindrical friction shell is used in combination with three friction shoes and a central wedge, the pressure between the shoes and the shell is automatically balanced and the wedge centered with respect to the shoes. In certain types of gears, it has been found desirable to make the friction surfaces of the shell tapered or converged inwardly of the shell, as for instance, in pending O'Connor application, Serial No. 610,198, filed January 2, 1923, and assigned to William H. Miner, the assignee of this application. Such cylindrical shells are used in order to retain the advantages of the cylindrical form. Where the cylindrical friction surfaces of the shell are made tapering or converging, it is very desirable to employ independent, true cylindric surfaces in order to maintain full surface contact between the shell surfaces and those of the shoes in all positions of the parts, as more fully pointed out in said O'Connor application. Heretofore, however, such independent, cylindric, converging friction surfaces have been so made that the centers of the radii of such surfaces, at their outer ends, are not only spaced apart, but are located between the central axis of the shell and the respective cylindric surface. At the inner ends of the cylindric surfaces, the formation is such that the centers of the respective radii preferably are made to coincide with the axis of the shell.

It has been found that in gears having a friction cylinder formed as described in the preceding, there is a tendency, accentuated by eccentrically applied blows to the pressure transmitting wedge, for the shoes to move circumferentially within the cylinder, thus causing the shoes to slip over from their proper surfaces, partly onto adjacent surfaces. This action induces uneven wear, scoring, and a decrease in the efficiency of the gear.

It is the object of my invention to provide a friction cylinder, or shell or casing, more particularly adapted for shock absorbing mechanisms of the character disclosed in said O'Connor pending application, wherein all the advantages of the cylindric type of shell having inwardly converged friction surfaces, are retained, and the friction-shoes positively prevented from shifting circumferentially within the shell from beyond their proper respective cylindric friction surfaces.

More specifically, the object of my invention is to provide a friction shell of the character indicated, which will be as economical to manufacture as any heretofore proposed and wherein the advantages of a circularly arranged series of three shoes and central wedge are also retained.

In the drawing forming a part of this specification, Figure 1 is a longitudinal sectional view of a friction shock absorbing mechanism showing my improvements in connection therewith, the section line through the movable friction elements corresponding to two planes at 120° apart, indicated best in Figure 2. Figure 2 is an end elevation of the mechanism shown in Figure 1. And Figure 3 is an end elevation of the friction shell upon an enlarged scale and illustrating also, the manner in which the friction surfaces are generated or formed.

In said drawing, A indicates the combined friction shell and spring cage; B, a spring resistance; C, a pressure transmitting wedge; D—D, two of the wedge-friction shoes; E, the third wedge-friction-shoe; F, a spring follower; and G, a retainer bolt.

The general arrangement of parts shown in the drawing is the same as that disclosed in said pending O'Connor application, and, briefly stated, comprises a wedge having one keen angle wedge face 10 and two blunt angle faces 11—11; two shoes D having correspondingly inclined blunt angle faces 12— 12; a third shoe E having a keen angle wedge face 13; a spring B with the washer or spring cap interposed between it and the inner ends of the shoes; and the retainer bolt G for holding the parts in assembled relation and the spring under initial compression. For a more specific description of the operation of the mechanism, reference may be had to said pending O'Connor application.

The improved friction shell, which in the instance shown is formed integral with the spring cage proper, is made as follows: On its interior, the shell is provided with three independent, true, cylindric friction surfaces 15—15. Said cylindric friction surfaces 15 are converged inwardly of the shell and are symmetrically arranged with respect to the longitudinal axis of the shell, as clearly indicated in Figure 3. Each of said surfaces 15 is formed on a radius, as indicated at $a$—$a$—$a$, which is of greater length than the distance between the longitudinal axis of the shell and any point on the respective cylindric surface 15. Stated in another manner, the length of each radius $a$ is such that when passing from the central point of a cylindric surface 15, it will pass through the axis of the shell and have its center located on the opposite side of said axis to that on which the respective cylindric surface is located. The centers of the radii of the surfaces 15, for the extreme outer portions of said surfaces, are indicated at $b$—$b$—$b$, said centers $b$ determining an equilateral triangle, the center of which coincides with the axis of the shell. The centers of the radii of the surfaces 15 at the inner ends thereof, are at the points indicated at $c$—$c$—$c$. It will be observed that the three points $c$ also determine an equilateral triangle and which is also so located that its center coincides with the center or the axis of the shell. With this arrangement, the independent cylindric friction surfaces 15 intersect each other throughout their entire length on lines indicated at 16—16. As will be observed from an inspection of Figure 3, this formation produces a shell interior which may be said to be of more or less triangular formation, of which the sides are curved. As will be understood by those skilled in the art, the exterior surfaces of the shoes D—D and E, are made on the same radius as the surfaces 15, the arc through which each shoe surface extends being slightly less than the arc through which each shell surface 15 extends.

With the arrangement shown and described, it is impossible for any shoe to shift circumferentially from off its own cylindric surface onto an adjacent cylindric surface on account of the angle which is formed where two adjacent shell surfaces intersect. In this manner, I am therefore enabled to insure each shoe functioning on its proper surface without danger of shifting or skewing to the end of promoting longer, more uniform wear, and more efficient operation. It will further be observed that I retain the advantages of a cylindric shell formation and the three shoe and central pressure transmitting wedge advantages, without any increase in the cost of manufacture of the shell.

While I have herein shown and described what I now consider the preferred manner of carrying out the invention, the same is by way of illustration and not by way of limitation. All changes and modifications are contemplated that come within the scope of the claims appended hereto.

I claim:

1. As an article of manufacture, a friction shell for shock absorbing mechanisms, said shell having a plurality of interior, longitudinally extending, independent, cylindric friction surfaces converged inwardly of the shell, each said surface being formed on a radius of greater length than the distance from any point thereof to the longitudinal axis of the shell.

2. As an article of manufacture, a friction shell for shock absorbing mechanisms, said shell having a plurality of interior, longitudinally extending, independent, cylindric friction surfaces converged inwardly of the shell, each said surface being formed on a radius of greater length than the distance from any point thereof to the longitudinal axis of the shell, said surfaces being symmetrically arranged with respect to the axis of the shell.

3. As an article of manufacture, a friction shell for draft gears having three interior, longitudinally extending, independent friction surfaces symmetrically arranged about the longitudinal axis of the shell, each surface having the longitudinal central portion thereof disposed nearest said axis.

4. As an article of manufacture, a friction shell for draft gears having three interior, longitudinally extending, independent friction surfaces disposed about the longitudinal axis of the shell, said surfaces intersecting longitudinally of the shell, the intersecting portions of said surfaces being spaced a greater distance from the longitudinal axis of the shell than the remaining portions thereof and said surfaces being converged inwardly of the shell.

5. As an article of manufacture, a friction shell for shock absorbing mechanisms, said shell having three interior, longitudinally extending, independent, true cylindric friction surfaces, converged inwardly of the shell, said surfaces being symmetrically arranged with respect to the axis of the shell and each surface being formed on a radius of greater length than the distance from any point thereof to the longitudinal axis of the shell.

6. As an article of manufacture, a friction shell for shock absorbing mechanisms, said shell having a plurality of interior, longitudinally extending, independent, cylindric friction surfaces, converged inwardly of the shell, said cylindric surfaces intersecting each other at their inner ends and the centers of the radii of the said surfaces, at the inner ends of the latter, being on the opposite side of the axis of the shell, with respect to each said surface.

7. As an article of manufacture, a friction shell for shock absorbing mechanisms, said shell having a plurality of interior, longitudinally extending, independent, concave, true, cylindric friction surfaces symmetrically arranged with respect to the axis of the shell and converged from the outer end of the shell inwardly thereof, the longitudinal central portions of said surfaces being nearest the longitudinal central axis of the shell.

In witness that I claim the foregoing I have hereunto subscribed my name this 13th day of March, 1923.

ARNOLD E. DENTLER.